US010621755B1

(12) United States Patent
Lester et al.

(10) Patent No.: US 10,621,755 B1
(45) Date of Patent: Apr. 14, 2020

(54) IMAGE FILE COMPRESSION USING DUMMY DATA FOR NON-SALIENT PORTIONS OF IMAGES

(71) Applicant: SHUTTERSTOCK, INC., New York, NY (US)

(72) Inventors: Kevin Scott Lester, Summit, NJ (US); Nathan Hurst, Seattle, WA (US); Michael Ranzinger, Boulder, CO (US)

(73) Assignee: Shutterstock, Inc., New York, NY (US)

( * ) Notice: Subject to any disclaimer, the term of this patent is extended or adjusted under 35 U.S.C. 154(b) by 0 days.

(21) Appl. No.: 16/230,005

(22) Filed: Dec. 21, 2018

Related U.S. Application Data

(62) Division of application No. 15/393,152, filed on Dec. 28, 2016, now Pat. No. 10,163,227.

(51) Int. Cl.
*G06T 9/00* (2006.01)
*G06K 9/46* (2006.01)
*G06T 7/194* (2017.01)

(52) U.S. Cl.
CPC ............ *G06T 9/002* (2013.01); *G06K 9/4652* (2013.01); *G06T 7/194* (2017.01); *G06K 2009/4666* (2013.01); *G06T 2207/20081* (2013.01)

(58) Field of Classification Search
None
See application file for complete search history.

(56) References Cited

U.S. PATENT DOCUMENTS

| 6,263,334 | B1 | | 7/2001 | Fayyad | |
|---|---|---|---|---|---|
| 6,320,976 | B1 | * | 11/2001 | Murthy, Sr. | ........... A61B 5/0002 382/128 |
| 6,978,419 | B1 | * | 12/2005 | Kantrowitz | ......... G06F 16/3346 715/209 |
| 7,809,192 | B2 | * | 10/2010 | Gokturk | ............ G06K 9/00375 382/176 |
| 8,630,513 | B2 | * | 1/2014 | Gokturk | ............ G06K 9/00375 382/305 |
| 9,349,077 | B2 | * | 5/2016 | Capuozzo | .......... G06K 9/00677 |
| 10,163,227 | B1 | * | 12/2018 | Lester | ..................... G06T 9/002 |
| 2005/0175101 | A1 | * | 8/2005 | Honda | ................... H04N 19/30 375/240.16 |

(Continued)

OTHER PUBLICATIONS

Hu et al, Improved JPEG Compression Algorithm Based on Saliency Map, 2012 5th International Congress on Image and Signal Processing (CISP 2012) (Year: 2012).*

(Continued)

*Primary Examiner* — Andrae S Allison
(74) *Attorney, Agent, or Firm* — McDermott Will & Emery LLP

(57) ABSTRACT

A computer-implemented method is provided for retrieving an image from a user in a desired format and for detecting a compression efficiency for the image. When the compression efficiency is above a pre-selected threshold the computer-implemented method includes obtaining a saliency representation of the image, capturing a feature description of a non-salient portion of the image, flattening the non-salient portion in a new image, storing the new image in a selected format in a memory and storing a background descriptor for the image in the memory.

20 Claims, 10 Drawing Sheets

SERVERS 130

CLIENTS 110

150 NETWORK

(56) References Cited

U.S. PATENT DOCUMENTS

| | | | |
|---|---|---|---|
| 2006/0067585 A1* | 3/2006 | Pace | G06K 9/3241 |
| | | | 382/243 |
| 2012/0036939 A1* | 2/2012 | Jarjour | A61F 5/01 |
| | | | 73/774 |
| 2012/0082387 A1 | 4/2012 | Zhang | |
| 2014/0279860 A1 | 9/2014 | Pan et al. | |
| 2015/0036939 A1 | 2/2015 | Cordara | |
| 2016/0117833 A1* | 4/2016 | Krauss | G06T 7/11 |
| | | | 382/173 |
| 2017/0185846 A1 | 6/2017 | Hwangbo | |
| 2017/0337271 A1* | 11/2017 | Lee | G06K 9/6276 |

OTHER PUBLICATIONS

Sudhakarl et al, Enhanced and Efficient Image Retrieval Via Visual Attention and Saliency Features, International Research Journal of Engineering and Technology (IRJET) e-ISSN: 2395-0056, vol. 03 Issue: 03 | Mar. 2016 (Year: 2016).*

Li et al, Visual Saliency Detection Based on Multiscale Deep CNN Features, IEEE Transactions on Image Processing, vol. 25, No. 11, Nov. 2016 (Year: 2016).*

R. Zhao, W. Ouyang, H. Li, and X. Wang, "Saliency detection by multicontext deep learning," Proc. IEEE Comput. Soc. Conf. Comput. Vis.Pattern Recognit., vol. 07-12-Jun., pp. 1265-1274, 2015. (Year: 2015).*

Gupta et al, Saliency Detection by Multi-Context Deep Learning, Signal Processing: Image Communication, vol. 28, Issue 9, Oct. 2013, pp. 1006-1022 (Year: 2013).*

Lee et al, Compressed domain video saliency detection using global and localspatiotemporal features, J. Vis. Commun. Image R. 35 (2016) 169-183. (Year: 2016).*

Kuo, et al., "Using deep convolutional neural networks for image retrieval." Electronic Imaging Jun. 2016.

Ghorbel et al., Object-based Video compression using neural networks, IJCSI International Journal of Computer Science Issues, vol. 8, Issue 4, No. 1, Jul. 2011.

Chen, Memory-Efficient Image Databases for Mobile Visual Search, <http://citeseerx.ist.psu.edu/viewdoc/download?doi=10.1.1.687.6131&rep=rep1&type=pdf>2014.

Chen et al., Tree Histogram Coding for Mobile Image Matching, 2009 Data Compression Conference.

Zhou, et al., "Learning Deep Features for Discriminative Localization," Dec. 14, 2015, retrieved from http://cnnlocalization.csail.mit.edu/Zhou Learning Deep Features CVPR 2016 paper.pdf, 10 pages.

* cited by examiner

IMAGE FILE COMPRESSION USING DUMMY DATA FOR NON-SALIENT PORTIONS OF IMAGES

CROSS-REFERENCE TO RELATED APPLICATIONS

The present application claims the benefit of priority under 35 USC § 120 as a division from U.S. patent application Ser. No. 15/393,152 filed on Dec. 28, 2016 and to be issued under U.S. Pat. No. 10,163,227 on Dec. 25, 2018, the contents of which are hereby incorporated by reference in its entirety for all purposes.

BACKGROUND

Field

The present disclosure generally relates to image file compression, and more particularly to methods and systems to provide image file compression in an image database associated with a search engine.

Description of the Related Art

Image compression in databases, search engines, and imaging devices such as cameras, video cameras and portable computing devices, commonly compromises file size with information content of the image. Higher information content of the compressed image usually comes at the price of insufficient size reduction, thus increasing the burden for storage of the compressed image and also for search operations through the database. Likewise, enhanced size reduction of the compressed image may be achieved at an information loss that is detrimental to the search engine performance, and to the user satisfaction.

SUMMARY

According to one embodiment of the present disclosure, a method is provided for retrieving an image from a user in a desired format and for detecting a compression efficiency for the image. When the compression efficiency is above a pre-selected threshold the computer-implemented method includes obtaining a saliency representation of the image, capturing a feature description of a non-salient portion of the image, flattening the non-salient portion in a new image, storing the new image in a selected format in a memory and storing a background descriptor for the image in the memory.

According to one embodiment of the present disclosure, a method is provided for requesting, from a server, a selected image via an application installed in a client device and retrieving, based on the selected image, a decompressed image in a desired image format. The computer-implemented method may include selecting a degree of saliency for modifying the decompressed image, and retrieving a modified image from the decompressed image, wherein the modified image is based on a modification of the decompressed image according to a background selector determined by the degree of saliency.

In some embodiments, a system is provided that includes one or more processors and a computer-readable storage medium coupled to the one or more processors. The computer-readable storage medium includes instructions that, when executed by the one or more processors, cause the one or more processors to receive request from a user to retrieve a selected image via an application installed in a client device and decompress the selected image into a decompressed image in a desired image format. The processor may further retrieve a first background descriptor for the selected image, obtain a modified image based on the decompressed image and a background descriptor of the selected image, and provide the modified image to the user.

In some embodiments, a non-transitory, computer-readable medium is provided that stores commands which, when executed by a processor in a computer, cause the computer to execute a method including steps to retrieve an image from a user in a desired format and to detect a compression efficiency for the image. When the compression efficiency is above a pre-selected threshold the method includes steps to obtain a saliency representation of the image, to capture a feature description of a non-salient portion of the image, to flatten the non-salient portion in a new image, to store the new image in a selected format in the non-transitory, computer-readable medium, and to store a background descriptor for the image in the non-transitory, computer-readable medium.

In some embodiments, a method is provided including requesting, from a server, a selected image via an application installed in a client device and retrieving, based on the selected image, a decompressed image in a desired image format. The method may include selecting a background descriptor in the client device for modifying the decompressed image and retrieving a modified image from the decompressed image and the background descriptor selected.

In yet other embodiments, a system is provided that includes a means for storing commands and a means for executing the commands to cause the system to retrieve an image from a user in a desired format and detect a compression efficiency for the image. When the compression efficiency is above a pre-selected threshold the means for executing the commands cause the system to obtain a saliency representation of the image, capture a feature description of a non-salient portion of the image, flatten the non-salient portion in a new image, store the new image in a selected format in a memory, and storing a background descriptor for the image in the memory.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1:
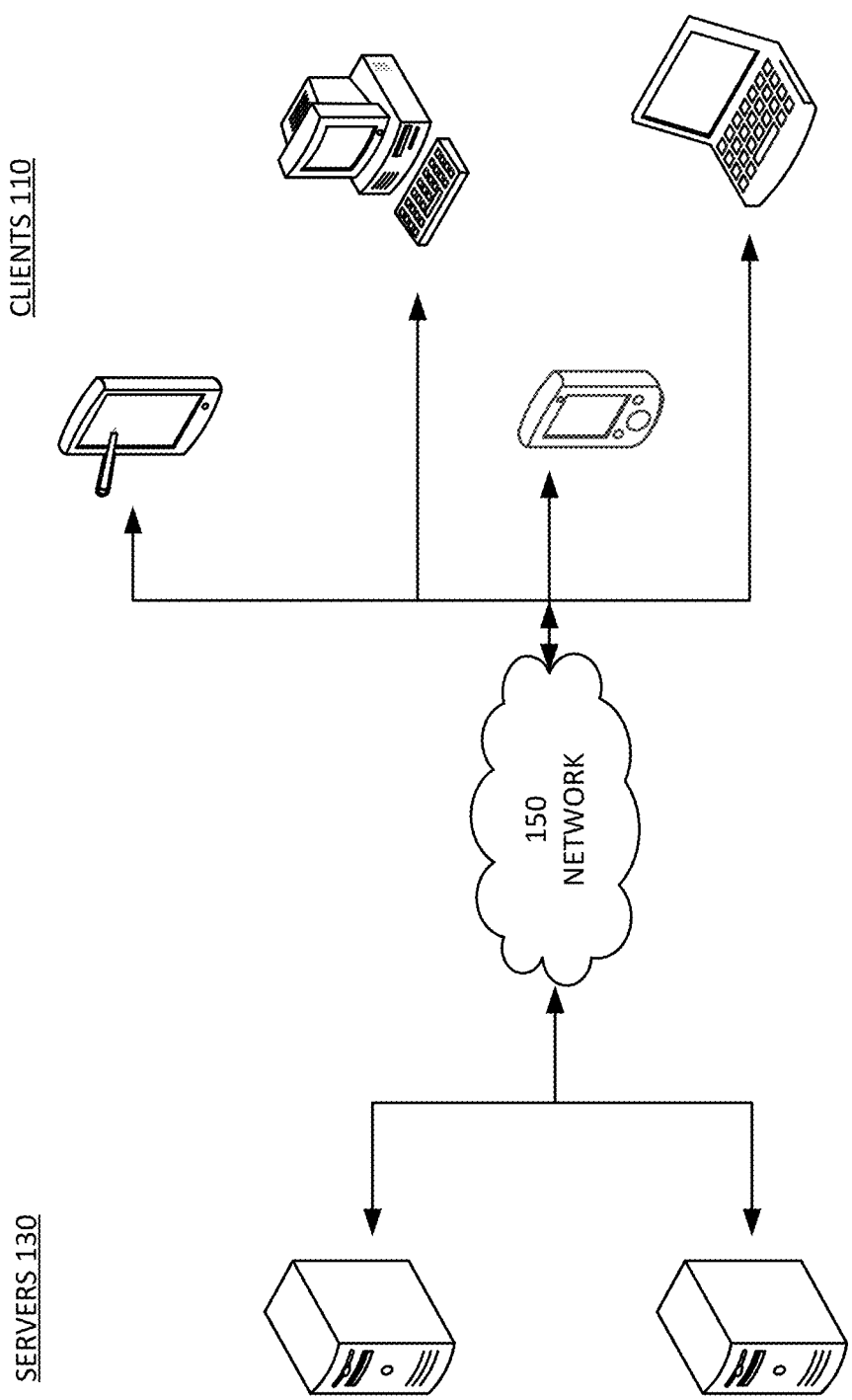
FIG. 1 illustrates an example architecture for image compression according to some implementations of the disclosure.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

As used herein, the term "content item" may be, for example, in reference to a digital file that is composed of one or more media elements of different types (text, image, video, audio, etc.). A content item can be a single picture or a single video file. The term "image identifier" as used herein may refer to a form of metadata such as a tag and/or a label associated with an image for identifying a characteristic of the image.

General Overview

Methods and systems as disclosed herein enhance image compression by using a neural network to select non-salient portions of an image for compression. Non-salient portions of the image representing less relevant aspects are replaced with "dummy" data to increase the compression efficiency with limited information loss. Additionally, methods and systems as disclosed herein include image decompression techniques that provide images having salient portions reproduced with high fidelity ("super-resolution") and non-salient portions that are reproduced with lower fidelity, to optimize overall image fidelity according to a user-selected criterion.

Visual media such as images are typically large in size at full resolution, thereby placing a heavy computational load on a search engine that parses through image files and on an image database that stores the data. The disclosed system addresses this problem specifically arising in the realm of computer technology by providing a solution also rooted in computer technology, namely, by accurately selecting salient and non-salient portions of an image, to allow for data loss (e.g., stronger compression) on the non-salient image portions and minimizing information loss (e.g., limited compression) on the salient image portions. In some embodiments, salient image portions are accurately selected and left substantially untouched while non-salient image portions are compressed more aggressively, allowing for smaller image size. Further, the image retrieval includes replacing the highly compressed non-salient image portions with suitable stock image data (e.g., background). The resulting decompressed image has a difference with the original image that is likely unnoticeable by a user.

The subject system provides several advantages including providing efficient storage for large collections of image files and efficient and accurate search engine capability. The system provides a machine learning capability where the system can learn from a content item in a database to determine salient portions and non-salient portions in an information-rich image file. Accordingly, the non-salient portions may offer an opportunity for image file compression without losing relevant features of the image (e.g., the salient portions). The proposed solution further provides improvements to the functioning of the computer itself because it saves data storage space and reduces network usage (e.g., during an image search). Moreover, embodiments disclosed herein provide the capability of stitching multiple compressed images together to form a compressed video clip.

Although many examples provided herein describe a user's search inputs being identifiable, each user may grant explicit permission for such user information to be shared or stored. The explicit permission may be granted using privacy controls integrated into the disclosed system. Each user may be provided notice that such user information will be shared with explicit consent, and each user may at any time end having the information shared, and may delete any stored user information. The stored user information may be encrypted to protect user security.

Example System Architecture

FIG. 1 illustrates an example architecture 100 for image file compression using dummy data for non-salient portions of images. Architecture 100 includes servers 130 and clients 110 that are communicatively coupled over a network 150.

One of servers 130 may be configured to host a computer-operated neural network. The neural network, which can be a convolutional neural network (CNN), is trained to identify features of images corresponding to one or more image identifiers. One of servers 130 also hosts a collection of images, videos, and multimedia files. The collection of images can be searched using an image search engine (e.g., accessible through a web page on one of clients 110). Images from the collection can also be used to train the CNN to identify features of the images and a degree of saliency of different portions of the images. Servers 130 can return images tagged with a corresponding saliency score to clients 110 in response to a search query. For purposes of load balancing, multiple servers 130 can host the CNN and multiple servers 130 can host the collection of images.

Servers 130 can be any device having an appropriate processor, memory, and communications capability for hosting the CNN, the collection of images, and the image search engine. The image search engine is accessible by various clients 110 over network 150. Clients 110 can be, for example, desktop computers, mobile computers, tablet computers (e.g., including e-book readers), mobile devices (e.g., a smartphone or PDA), or any other devices having appropriate processor, memory, and communications capabilities for accessing the image search engine on one of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Example Image Compression System

Figure 2:
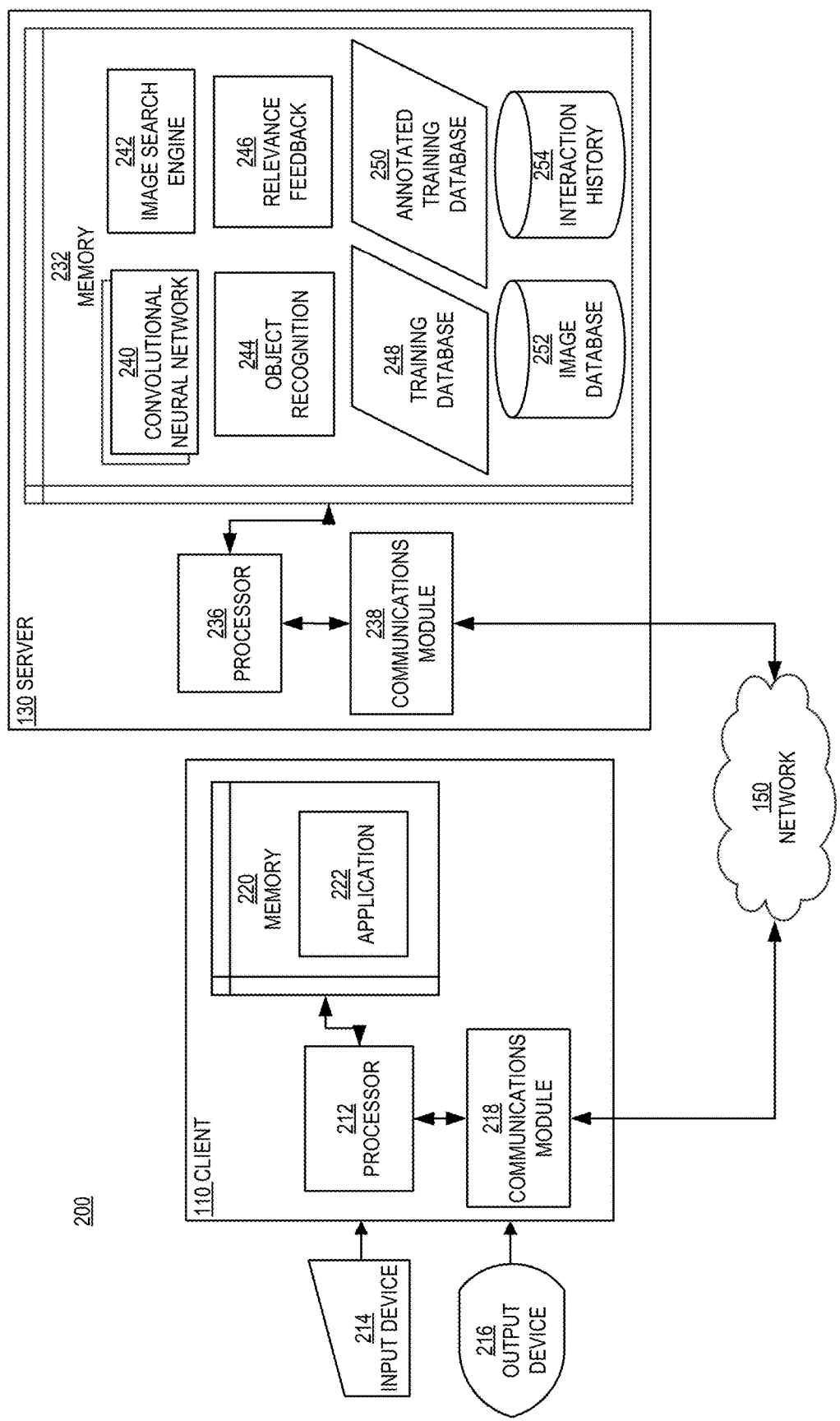
FIG. 2 is a block diagram illustrating an example client and server from the architecture of FIG. 1 according to certain aspects of the disclosure.

FIG. 2 is a block diagram 200 illustrating an example server from any one of servers 130 and a client from any one of clients 110 in architecture 100, according to certain aspects of the disclosure. Client 110 and server 130 are connected over network 150 via respective communications modules 218 and 238. Communications modules 218 and 238 are configured to interface with network 150 to send and receive information, such as data, requests, responses, and commands to other devices on the network. Communications modules 218 and 238 can be, for example, modems or Ethernet cards.

Server 130 includes a memory 232, a processor 236, and a communications module 238. Memory 232 includes a CNN 240. In one or more implementations, CNN 240 may be a series of neural networks, with one neural network configured to perform a determination of salient and non-salient portions of image files. As discussed herein, CNN 240 is a type of feed-forward artificial neural network where individual neurons are tiled in such a way that the individual neurons respond to overlapping regions in a visual field. The architecture of CNN 240 may be in the style of existing well-known image classification architectures such as AlexNet, GoogLeNet, or Visual Geometry Group models. In certain aspects, the convolutional neural network 240 consists of a stack of convolutional layers followed by several fully connected layers. CNN 240 can include a loss layer (e.g., softmax or hinge loss layer) to back propagate errors so that CNN 240 learns and adjusts its weights to better fit provided image data.

Memory 232 also includes an image database 252 and an image search engine 242 for searching image database 252. In one or more implementations, image database 252 represents a database that contains, for each image, a mapping from an image identifier to a data file containing pixel data for the image (e.g., in "JPEG," "TIFF," "GIF," "PNG" formats, and the like). Also included in memory 232 is a training database 248. Training database 248 can be, for example, a dataset of content items (e.g., images) corresponding to a predetermined number of style classes (e.g., about 10 to 20 style classes) with a predetermined number of content items (e.g., about 10,000 images) per style class. The predetermined number of style classes may include, for example, a style class for abstract images, logo images, icon images, isolated images, texture images, Instagram images, illustration images, background images, stocky people images, high dynamic range (HDR) images, collection images, macro images, candid people images, vector images, pattern images, etc.

Training database 248 may include multiple instances (or sets) of training data, where each instance (or set) of training data is associated with a particular style class. In some embodiments, training database 248 includes a label indicating a style class strength (e.g., very candid, somewhat candid, not candid) as well as the images. Style class information may be useful to determine the saliency or lack thereof of a plurality of pixels in a portion of an image file, as disclosed herein. Training database 248 also may include image vector information and image cluster information, in which the image vector information identifies training vectors representing a large sample of training images and the image cluster information identifies clusters representing respective semantic concepts. In this respect, the vectors corresponding to a semantic concept (e.g., coffee) are clustered into one cluster representing that semantic concept. In one or more implementations, training database 248 may be populated with public domain images from third-party photo sharing websites. In this respect, training database 248 may include a labeled data set with stock background images indicating different types of backgrounds that may have been encountered historically through the use of image database 252 and search engine 242. For example, stock background images may include images of people attending events in a stadium or auditorium, different versions of a background sky (e.g., "blue sky," "sunny sky," "somewhat overcast sky," "a single cloud," and the like), horizon (sea horizon, desert horizon, prairie horizon), lawn, cement walls, brick walls, and so forth.

Memory 232 also includes an annotated training database 250. Annotated training database 250 may include targeted data gathered via third-party crowd-sourcing platforms (e.g., MTurk, CrowdFlower, etc.). Annotated training database 250 may include images from the image database 252 that are human annotated with information indicating a background descriptor according to a user that uploaded the image. Annotated training database 250 may be utilized to further refine the training of CNN 240.

Image database 252 can be, for example, a dataset of trained images corresponding to a number of style classes (e.g., about 25). Each of the images may include a background descriptor based on the corresponding style classes applicable to the image. The images may be paired with image vector information and image cluster information. The image vector information identifies vectors representing a large sample of images (e.g., about 50 million) and the image cluster information identifies the vectors in one or more clusters such that each of the cluster of images represents a semantic concept. The semantic concept may thus be associated to a background descriptor as indicated above (e.g., "sports audience," "performing arts audience," "city skyline," and the like).

Although training database 248 is illustrated as being separate from image database 252, in certain aspects training database 248 is a subset of image database 252. Furthermore, although image database 252 and image search engine 242 are illustrated as being in the same memory 232 of server 130 as CNN 240, in certain aspects image database 252 and image search engine 242 can be hosted in a memory on a different server communicatively coupled with server 130 in FIG. 2.

In some aspects, processor 236, using a relevance feedback database 246, can tag each of the images in image database 252 with metadata identifying an index to a corresponding salient portion of the images or a non-salient portion of the images, the metadata also identifying an index to a style class in a training database 244. For example, some of the images in image database 252 may be stored to provide background fields that may be useful in decompressing and reconstructing images. For such images having valuable background information, a background descriptor may emphasize this aspect in relevant feedback database 246. The tagging can serve as an indication of an association between a corresponding saliency value and one or more style classes. The metadata may be a metadata file including the background descriptor and stored as a flat document or an index identifying a storage location in image database 252. For example, the metadata file may include one or more rows of data including an image identifier, an image URL, a style identifier (e.g., identifying the corresponding style class), and a background descriptor.

Memory 232 also includes an interaction history database 254. In certain aspects, processor 236 is configured to determine data to be stored in interaction history database 254 by obtaining user interaction data identifying interactions with images from image search results that are responsive to search queries. In this respect, search results may be personalized based on a saliency value selected for the most-recent images uploaded or downloaded by the user. Processor 236 may keep track of the user interactions and saliency values selection for a number of images over a given time period. In one or more implementations, processor 236 may track a saliency value of the last N images that the user interacted with as well as a current user query, where N is a positive integer value. Interaction history database 254 may also include data indicating search behavior (and/or patterns) relating to prior image search queries.

Processor 236 is configured to execute instructions, such as instructions physically coded into processor 236, instructions received from software in memory 232, or a combination of both. For example, processor 236 executes instructions to submit a plurality of training images containing content identifying different semantic concepts (e.g., woman, coffee) to CNN 240 that is configured to analyze image pixel data for each of the plurality of training images to identify features, in each of the plurality of training images, corresponding to a particular semantic concept and receive, from CNN 240 and for each of the plurality of training images, an identification of one or more style classes corresponding to the image processed by CNN 240.

In certain aspects, processor 236 is configured to receive a user input from a user. The user input identifies a search query in a given natural language. For example, the search query may be entered as an English term. A user of client 110 may use input device 216 to submit a search term or phrase via a user interface of an application 222. The user interface may include an input section where the search term or phrase may be typed in, for example. The input section may include one or more controls to allow the user to initiate the image search upon receiving the search query. In some aspects, the image search may be initiated automatically upon receiving at least one search term (or at least the search phrase in part). As described herein, the natural language used is not limited to English, and the number of natural languages can vary to include other natural languages depending on implementation.

The search query is provisioned to image search engine 242 for initiating the image search through image database 252. The user input is provided, for example, by the user accessing image search engine 242 over network 150 using application 222 in memory 220 on client 110 of the user, and the user submitting the user input using input device 214 of client 110. For example, the user may use input device 214 to enter a text-based search term or phrase. In response to the user input via application 222, a processor of client 110 is configured to transmit the search query over network 150 using communications module 218 of client 110 to communications module 238 of server 130.

Processor 236, upon receiving the search query for image search engine 242, is configured to submit a search request for the search query to image search engine 242. Processor 236 then receives an identification of a plurality of images, with varying levels of relevance (e.g., using a relevance feedback database 246), from image database 252, which are responsive to the search query, and is configured to provide a listing of images with a ranking (or prioritization) according to a search probability (e.g., using interaction history data 254). The listing of images that is prioritized (or ranked) according to the user interaction probabilities is provided, for example by processor 236, which may be configured to submit a set of training images (e.g., training database 248, annotated training database 250) to CNN 240 prior to the search query being received. Processor 236, using a logistic regression model, identifying an appropriate background for non-salient portions of the images in image database 252. Processor 236 may then provide the listing of images to application 222 on client 110 over network 150 for display by an output device 216 of client 110.

FIGS. 3A-E illustrate an example of an image compression method according to some embodiments. The image compression method in FIGS. 3A-E may be performed at least partially by a processor 212 in any one of servers 130 and by processor 236 in any one of clients 110 communicatively coupled through network 150. For example, in some embodiments a user may access server 130 through client 110, and perform at least some of the operations illustrated in FIGS. 3A-E through a user interface displayed on the client and provided by the server. In some embodiments, at least some of the operations illustrated in FIGS. 3A-E may be performed entirely by a processor with the client device by the user, without logging into the server through a network.

Figure 3A:
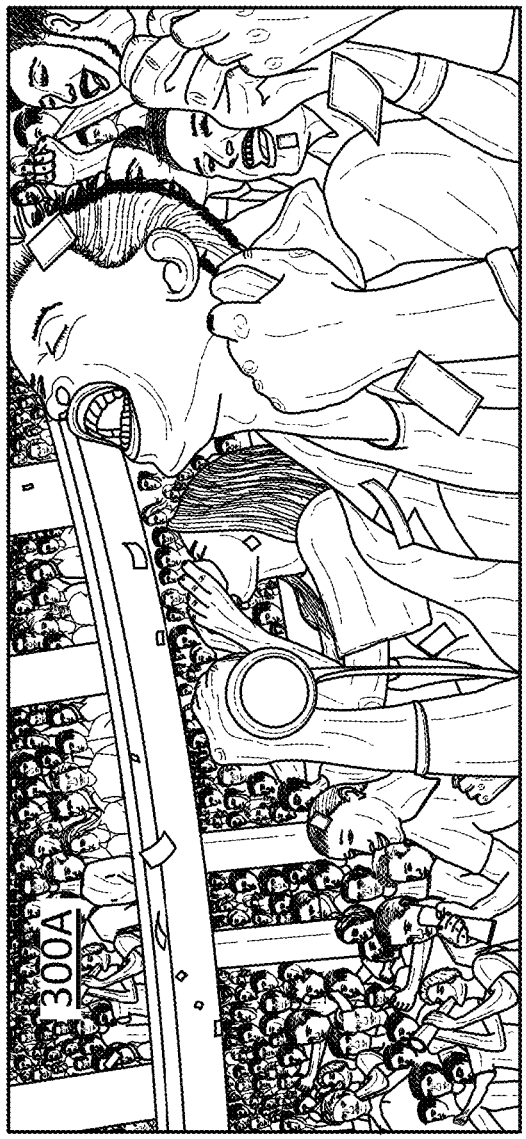
FIGS. 3A-E illustrate an example of an image compression method according to some embodiments.

FIG. 3A illustrates an image 300A that may be retrieved from image database 252 by image search engine 242. In some embodiments, image 300A may also be captured by the client device. A processor may be configured to parse image 300A and perform a saliency partition of the pixels in the image into at least one "salient" portion and at least one "non-salient" portion, according to a saliency value assigned to a saliency criterion. The saliency value may be any number between 0 and 1 indicating the degree of relevance given to the saliency criterion for deciding whether a pixel in image 300A belongs in a salient portion or a non-salient portion.

Figure 3B:
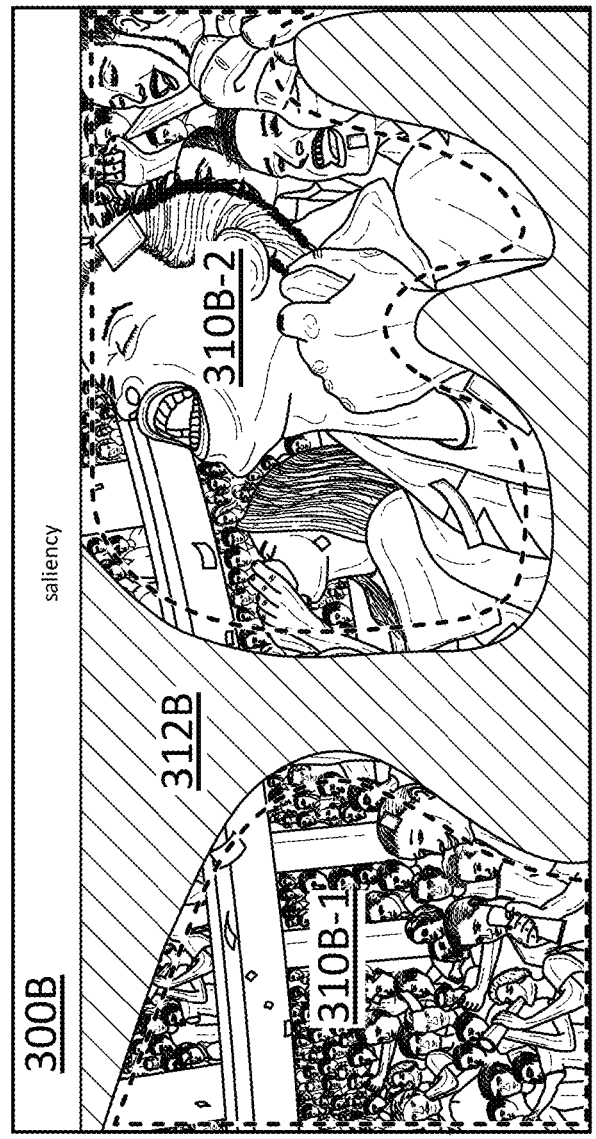

FIG. 3B illustrates a saliency partition 300B of image 300A. Saliency partition 300B includes at least a salient portion 310B and non-salient portions 312B-1 and 312B-2 (hereinafter collectively referred to as "non-salient portions 312B"). Saliency partition 300B is obtained by assigning a saliency value to the salient criterion "human faces."

Figure 3C:
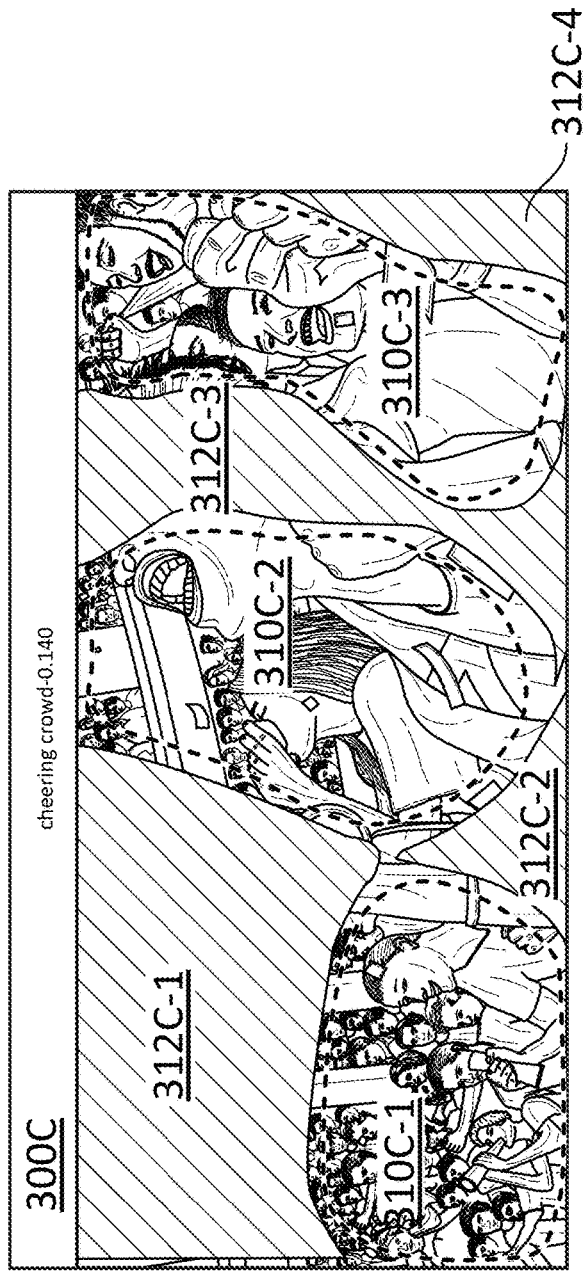

FIG. 3C illustrates a saliency partition 300C of image 300A. Saliency partition 300C includes at least a salient portion 310C-1, 310C-2, and 310-C-3 (hereinafter collectively referred to as "salient portions 310C"), and non-salient portions 312C-1, 312C-2, and 312C-3 (hereinafter collectively referred to as "non-salient portions 312C"). For example, saliency partition 300C may be obtained by assigning a saliency value 0.140 to a salient criterion "cheering crowd."

Figure 3D:
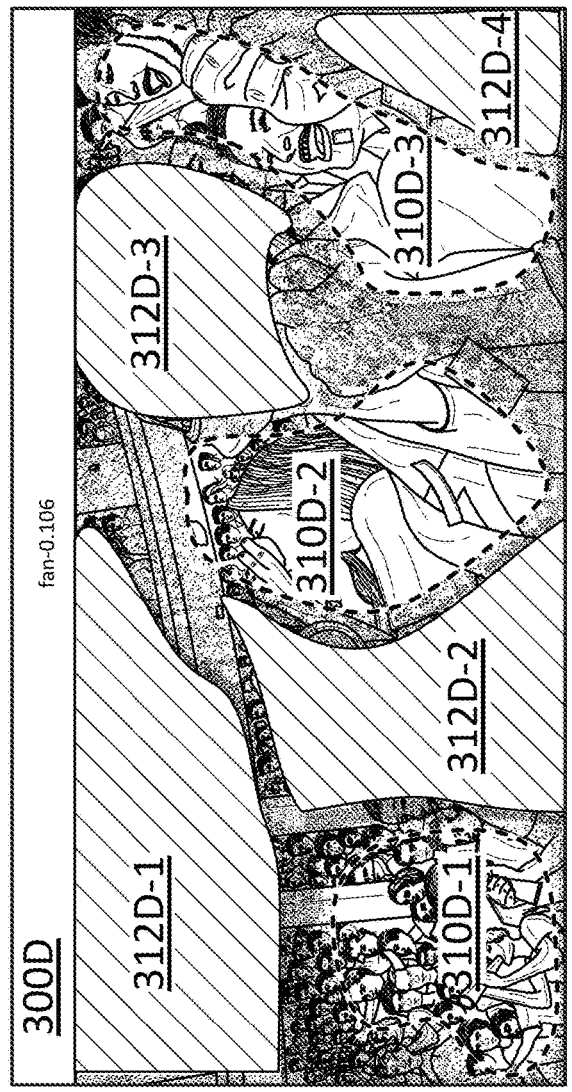

FIG. 3D illustrates a saliency partition 300D of image 300A. Saliency partition 300D includes at least a salient portion 310D-1, 310D-2, and 310D-3 (hereinafter collectively referred to as "salient portions 310D") and non-salient portions 312D-1, 312D-2, 312D-3, and 312D-4 (hereinafter collectively referred to as "non-salient portions 312D"). Saliency partition 300D is obtained by assigning a saliency value of 0.106 to a salient criterion "fan."

Figure 3E:
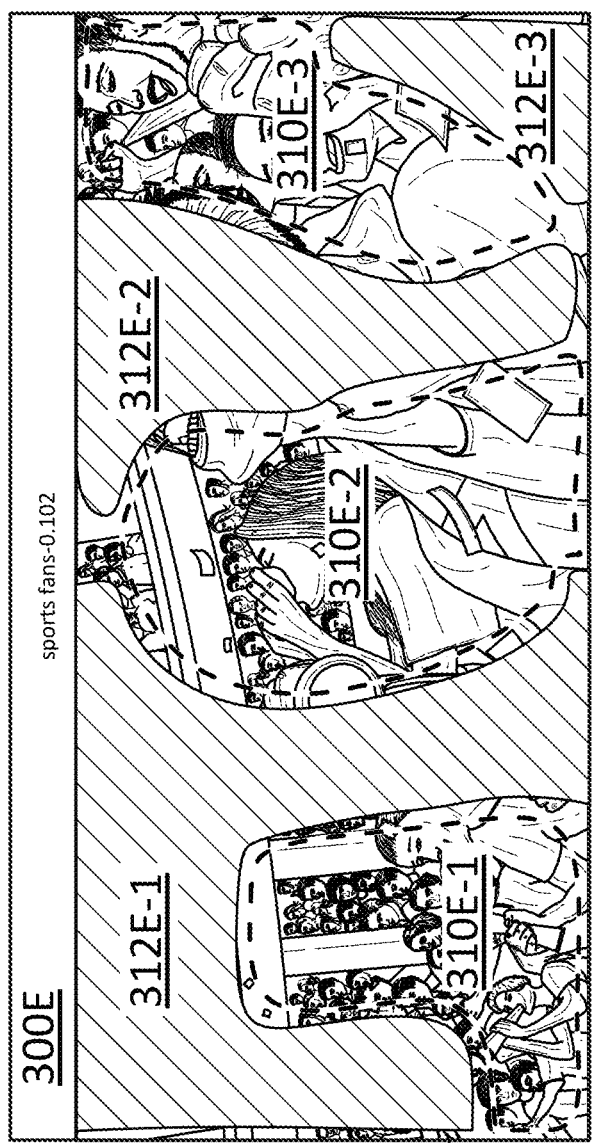

FIG. 3E illustrates a saliency partition 300E of image 300A. Saliency partition 300E includes at least a salient portion 310E-1, 310E-2 and 310E-3 (hereinafter collectively referred to as "salient portions 310E") and non-salient portions 312E-1, 312E-2, and 312E-3 (hereinafter collectively referred to as "non-salient portions 312E"). Saliency partition 300E is obtained by assigning a saliency value 0.102 to a salient criterion "sports fans."

Each one of saliency partitions 300B, 300C, 300D, and 300E (hereinafter, collectively referred to as "saliency partitions 300") may be used in a compression method as disclosed herein. Accordingly, a method for image compression may flatten non-salient portions 312 in each of saliency partitions 300, thus reducing substantially the amount of information contained in saliency partitions 300. In some aspects, flattening a non-salient portion may include configuring every pixel within the non-salient portion the same color value (e.g., black, white, gray, green, and the like). Furthermore, in some embodiments saliency partitions 300 may be stored in the image database using compression techniques suitable for any user-desired image format (e.g., JPEG, TIFF, GIF, PNG and the like). To recover image 300A after any one of saliency partitions 300 are retrieved and decompressed (according to format) from the image database, a background descriptor vector may indicate a second image from the image database. The second image may include background portions that are a close representation of the original background. The background portions are thus selected to replace the flattened, non-salient portions in the saliency partition. Thus, image 300A (or an image that looks very similar to image 300A), may be recovered by the user for display, downloaded or edited.

Figure 4:
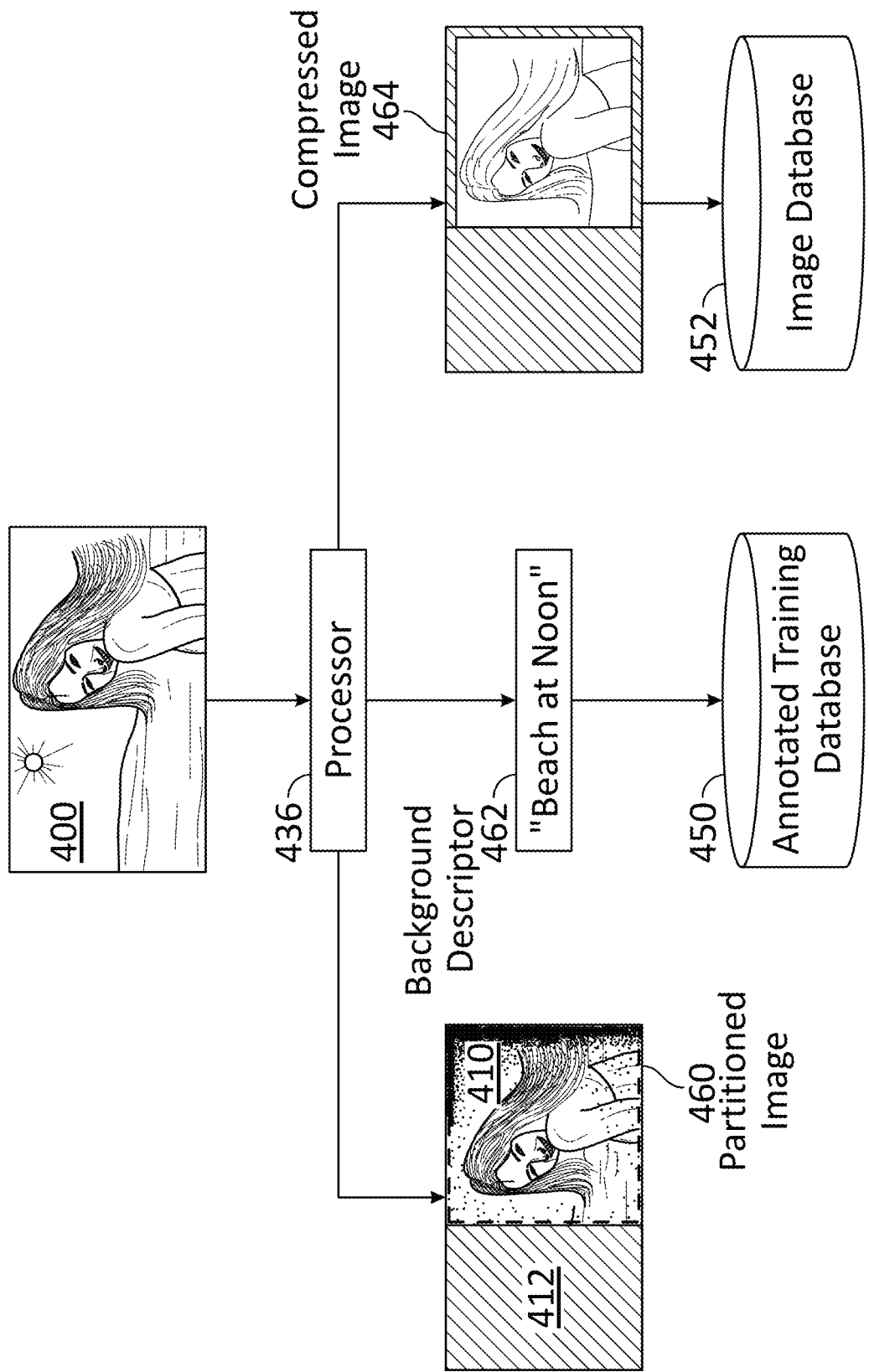
FIG. 4 is a walk-through illustration for applying an image compression method according to some embodiments.

FIG. 4 is a walk-through illustration for applying an image compression method according to some embodiments. Image 400 is collected either by capturing the image with a client device or by image search engine 242 from image database 252. For exemplary purposes only, the image shows a smiling woman on the beach, at noon. Processor 436 provides a partitioned image 460 from image 400. Partitioned image 460 may be a saliency partition of image 400, including at least a salient portion 410 and a non-salient portion 412. In the exemplary embodiment, salient portion 410 includes a crop of the smiling woman with almost no background. Non-salient portion 412 includes a flattened (in black) beach background. Processor 436 also provides a background identifier 462 "Beach at noon," which is obtained from a CNN (e.g., CNN 240), a relevant feedback database (e.g., relevant feedback database 246), and an image database (e.g., image database 252).

In some embodiments, background descriptor 462 may be stored in an annotated training database 450. After determining that partitioned image 460 correctly captures the salient portions of relevance for the user and the user selects an image storage format, processor 436 performs an image compression to provide compressed image 464. Compressed image 464 maintains the main features of the smiling woman but uses a reduced amount of pixel data, particularly because all the pixels in non-salient portion 412 have been replaced by a same color value (e.g., black). Compressed image 464 is then stored in image database 452. In some embodiments, processor 436 includes a pointer in the file for compressed image 464 pointing to the background descriptor 462 in annotated training database 450.

When a user wants to retrieve image 400, processor 436 collects compressed image 464 and, using background descriptor 462, it replaces the flattened area of non-salient portion 412 with a background corresponding to a "beach at noon" search criterion. In some embodiments, processor 436 selects the replacement for non-salient portion 412 by decompressing compressed image 464 and using the decompressed file together with background descriptor 462 in the CNN to obtain an accurate representation of a beach at noon in non-salient portion 412.

In some embodiments, the user may be able to adjust or change the result by selecting a degree of saliency to the decompressed version of the compressed image, as an input to the CNN.

Figure 5:
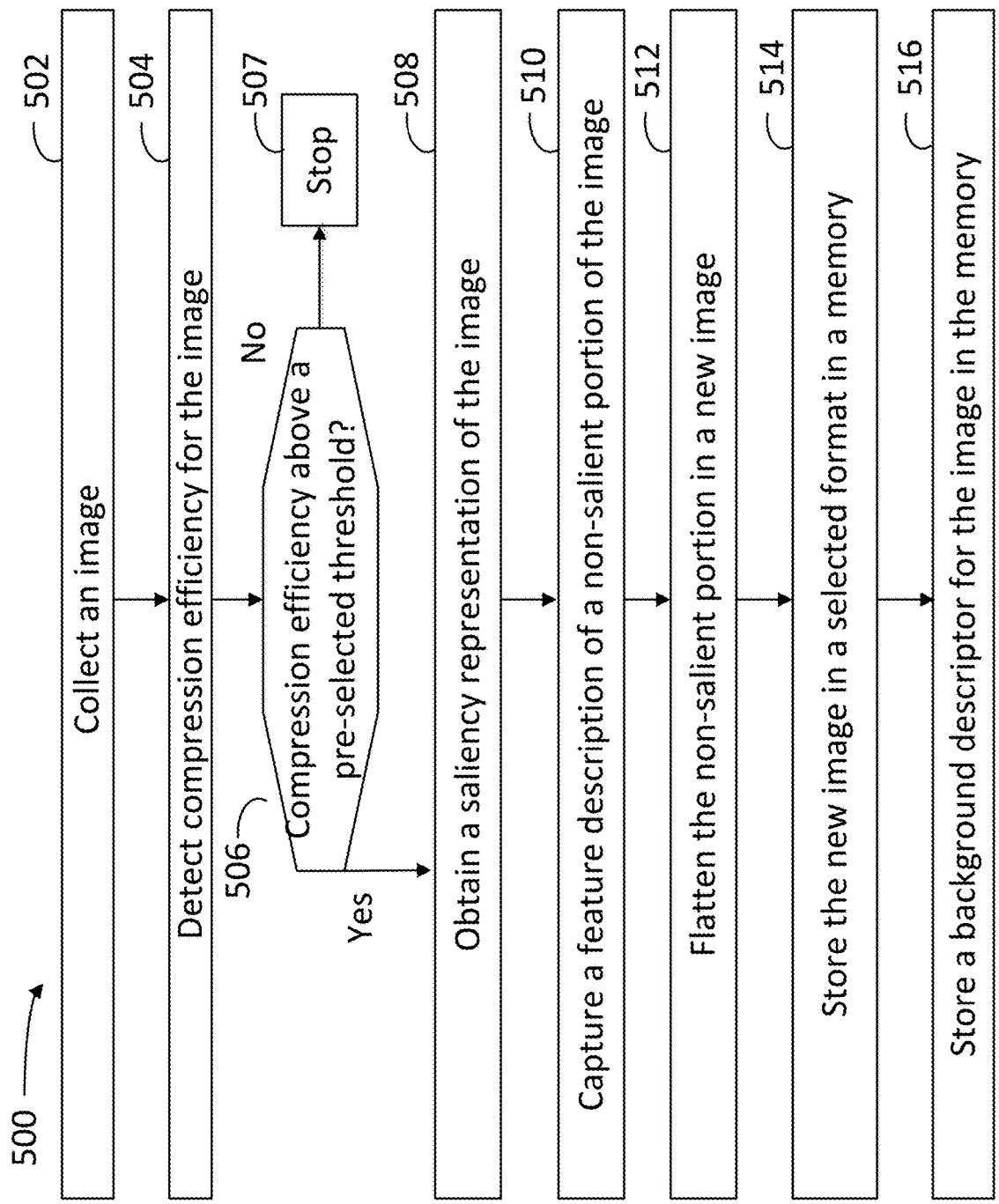
FIG. 5 is a flow chart illustrating steps in a method for image compression, according to some embodiments.

FIG. 5 is a flow chart illustrating steps in a method 500 for image compression according to some embodiments. Method 500 may be performed at least partially by any one of network servers hosting a collection of images, videos, and multimedia files (e.g., images 300A-E, 400), while communicating with any one of a plurality of client devices (e.g., any one of servers 130 and any one of clients 110). The client devices may be handled by a user, wherein the user may be registered to a private account with the server, or may be a visitor to the server website or logged in a server application installed in the client device. At least some of the steps in method 500 may be performed by a computer having a processor executing commands stored in a memory of the computer (e.g., processors 212 and 236, memories 220 and 232). In some embodiments, the commands executed by the processor may include a neural network (e.g., CNN 240). Further, steps as disclosed in method 500 may include retrieving, editing, and/or storing files in a database that is part of, or is communicably coupled to, the computer, using, inter-alia, an image search engine (e.g., image search engine 242). The database may include any one of an image database, an interaction history database, a training database, or an annotated training database (e.g., image database 252, interaction history database 254, training database 248, and annotated training database 250). Methods consistent with the present disclosure may include at least some, but not all of the steps illustrated in method 500, performed in a different sequence. Furthermore, methods consistent with the present disclosure may include at least two or more steps as in method 500 performed overlapping in time, or almost simultaneously.

Step 502 includes collecting an image. In some embodiments, step 502 may include capturing an image with an optical device included in, or communicatively coupled with the client. In some embodiments, step 502 may include retrieving the image from the image database using the image search engine.

Step 504 includes detecting a compression efficiency for the image. In some embodiments, the degree of compression for the image is a value corresponding to a ratio of the size of the compressed image to the size of the uncompressed image. Accordingly, in some embodiments the compression efficiency for an image may be associated to a "candidacy for compression" of the image, as a higher compression efficiency makes the image a better candidate for compression. In some embodiments, when the compression efficiency detected is below a pre-selected threshold, the image is not compressed any further and is stored as is in the database. In some embodiments, step 504 includes comparing a first image vector for the image with a second image vector of the second image from an interaction history database, and defining the compression efficiency based on a compression efficiency of the second image when the distance between the first image vector and the second image vector is lower than a pre-selected threshold. In some embodiments the first and second image vectors are produced by the CNN applied over the entire image.

Step 506 includes determining whether the compression efficiency for the image is above a pre-selected threshold. When the compression efficiency for the image is below the pre-selected threshold according to step 506, step 507 includes stopping method 500. Step 507 may determine to stop method 500 based on comparing the computational cost of compressing the collected image and that of storing the uncompressed collected image.

When the compression efficiency for the image is above the pre-selected threshold according to step 506, step 508 includes obtaining a saliency representation of the image. In some embodiments, step 508 includes feeding the image into the CNN, which may be trained to categorize the image into one of the top 'k' queries within a selected database (where 'k' is a pre-selected integer). Further, in some embodiments step 508 includes localizing at least one object within the image using the CNN. In some embodiments step 508 may further include computing saliency of the at least one object by using average activations in addition to a weighted sum of feature maps from the last convolutional layer in the neural network classifier. In some embodiments, step 508 includes associating a saliency value to at least a portion of the image, wherein the saliency value is determined from a style class strength of the portion of the image.

Step 510 includes capturing a feature description of a one non-salient portion of the image. In some embodiments, step 510 includes storing in the memory a reference to a stored feature description of an image stored in the image database. In some embodiments, step 510 includes determining an average vector over non-salient areas of the image. In some embodiments, step 510 includes processing the retrieved image with a deep learning descriptor model that partitions non-salient portions of the image into background portions and assigns a vector value for each of the background portions. The vector value may be associated to background features that may be later recovered during image reconstruction. For example, some background features may be associated with descriptors such as "fuzzy garden," "cloudy sky," "ocean," "stadium audience," "dense canopy," "cement wall," and the like. In some embodiments, step 510 includes determining the non-salient portion of the image based on a saliency value of the non-salient portion being lower than a pre-selected threshold, wherein the saliency value is determined from a style class strength of the non-salient portion of the image. In some embodiments, step 510 includes associating a background descriptor to the non-salient portion of the image based on a similarity between the non-salient portion of the image and a second portion of an image stored in an image database.

Step 512 includes flattening the non-salient portion in a new image. In some embodiments, step 512 includes using a predominant color from the at least one non-salient portion. In general, saliency is a value that can vary from 0 to 1. Accordingly, in some embodiments step 512 includes blanking out, graying, blurring, or similar flattening operations to the non-salient portions of the new image. In some embodiments, step 512 includes, for at least one non-salient portion of the image, blending the original pixel color down to the average background depending on the saliency. Accordingly, in some embodiments a saliency of 0 would mean changing the pixel to background color in step 512. And a saliency of 1 would mean keeping the original pixel color in step 512. In some embodiments, step 512 may include evaluating the saliency of the surrounding pixels for at least one pixel. Accordingly, step 512 may include increasing a saliency value of a non-salient pixel when the surrounding pixels are salient. In some embodiments, step 512 includes using aggressive decay when a saliency value for a pixel is below a pre-selected threshold. Accordingly, in some embodiments step 512 includes configuring all pixels in a non-salient portion to have the same color when the saliency value for at least one pixel in the non-salient portion is below the pre-selected threshold. In some embodiments, step 512 includes configuring all pixels in a non-salient portion to have the same color when an average saliency value for the pixels in the non-salient portion is below the pre-selected threshold. In some embodiments, step 512 includes configuring a plurality of pixels in the non-salient portion of the image to have a same color value.

Step 514 includes storing the new image in a selected format in a memory. In some embodiments, step 512 may include storing the image in a JPG format, TIFF format, GIF format, PNG format, and the like. In some embodiments, step 514 includes storing the new image in a compressed version of the selected format.

Step 516 includes storing a background descriptor for the image in the memory. In some embodiments, step 516 includes storing the background descriptor in an annotated training database. In some embodiments step 516 includes storing the background descriptor in the form of a text string provided by the user. The text string may include a description of the background in the user's own words. Accordingly, step 516 may include storing the background descriptor in an annotated training database comprising the text string provided by the user. Further, step 516 may include selecting a representative vector from an annotated training database comprising a plurality of vectors associated with the text string provided by the user. For example, when the background descriptor includes just a text string such as 'wood texture', then the CNN forms an annotated database of 'wood texture' vectors (e.g., using images previously stored in the image database). Step 516 may include selecting a representative vector from the annotated database to stand-in for 'wood texture' in a decompression phase of the compressed image. In some embodiments, step 516 includes averaging at least two of the 'wood texture' vectors in the annotated database to select a "wood texture" representative vector. In some embodiments, step 516 includes randomly sampling the annotated database to select a "wood texture" representative vector.

Figure 6:
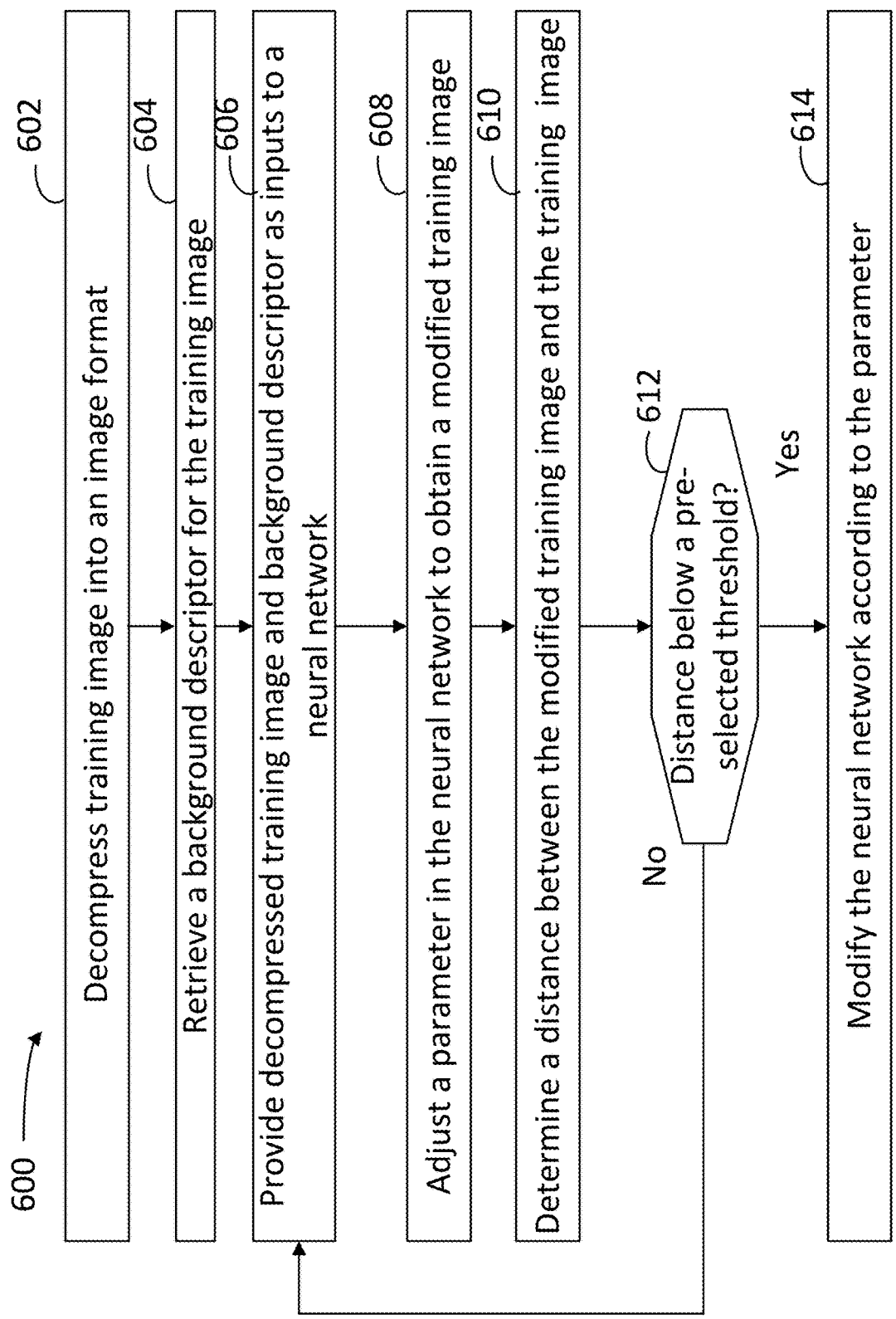
FIG. 6 is a flow chart illustrating steps in a method for image decompression according to some embodiments.

FIG. 6 is a flow chart illustrating steps in a method 600 for image decompression according to some embodiments. Method 600 may be performed at least partially by any one of network servers hosting a collection of images, videos, and multimedia files (e.g., images 300A-E and 400), while communicating with any one of a plurality of client devices (e.g., any one of servers 130 and any one of clients 110). The client devices may be handled by a user, wherein the user may be registered to a private account with the server, or may be a visitor to the server website or logged in a server application installed in the client device. At least some of the steps in method 600 may be performed by a computer having a processor executing commands stored in a memory of the computer (e.g., processors 212 and 236, memories 220 and 232). In some embodiments, the commands executed by the processor may include a neural network (e.g., CNN 240). Further, steps as disclosed in method 600 may include retrieving, editing, and/or storing files in a database that is part of, or is communicably coupled to, the computer. The database may include any one of an image database, an interaction history database, a training database, or an annotated training database (e.g., image database 252, interaction history database 254, training database 248, and annotated training database 250). Methods consistent with the present disclosure may include at least some, but not all of the steps illustrated in method 600, performed in a different sequence. Furthermore, methods consistent with the present disclosure may include at least two or more steps as in method 600 performed overlapping in time, or almost simultaneously.

Step 602 includes decompressing a training image retrieved in a selected format. In some embodiments, step 602 includes decompressing an image in a JPG format, TIFF format, GIF format, PNG format, and the like.

Step 604 includes retrieving a background descriptor for the training image. In some embodiments, step 604 includes loading a description vector for at least one background portion in the training image. In some embodiments, step 604 includes receiving, from the user, a degree of saliency for the modified image, and retrieving a first background descriptor based on the degree of saliency.

Step 606 includes providing the decompressed training image and the background descriptor as inputs to a neural network.

Step 608 includes adjusting a parameter in the neural network to obtain a modified training image. In some embodiments, step 608 may include retrieving a second non-salient portion from a second image stored in the image database and replacing the non-salient portion in the training image with the second non-salient portion. In some embodiments, step 608 includes retrieving, from the annotated training database, a first background descriptor associated with the training image and a second background descriptor associated with the first background descriptor and adjusting the parameter in the neural network to obtain a modified training image according to the second background descriptor.

In some embodiments, the neural network in step 608 includes a plurality of nodes arranged in a plurality of layers, and step 608 includes training the neural network to obtain the modified image based on the decompressed image and the background descriptor. For example, in some embodiments step 608 may include adjusting a plurality of weighting factors associated with each of the plurality of nodes to obtain the modified training image.

Step 610 includes determining a distance between the modified training image and the training image. In some embodiments step 610 includes determining the distance between two image vectors associated with the modified training image and with the training image, respectively, in the training database.

Step 612 includes verifying that the distance between the modified training image and the training image is below a pre-selected threshold. When the distance between the modified training image and the training image is equal to or above the pre-selected threshold, the method is repeated from step 606.

When the distance between the modified training image and the training image is below the pre-selected threshold, step 614 includes modifying the neural network according to the adjusted parameter. For example, in some embodiments step 614 includes training the CNN to replace a non-salient portion of the selected image with a second non-salient portion of a second image stored in the image database according to a difference between the modified image and the selected image.

Figure 7:
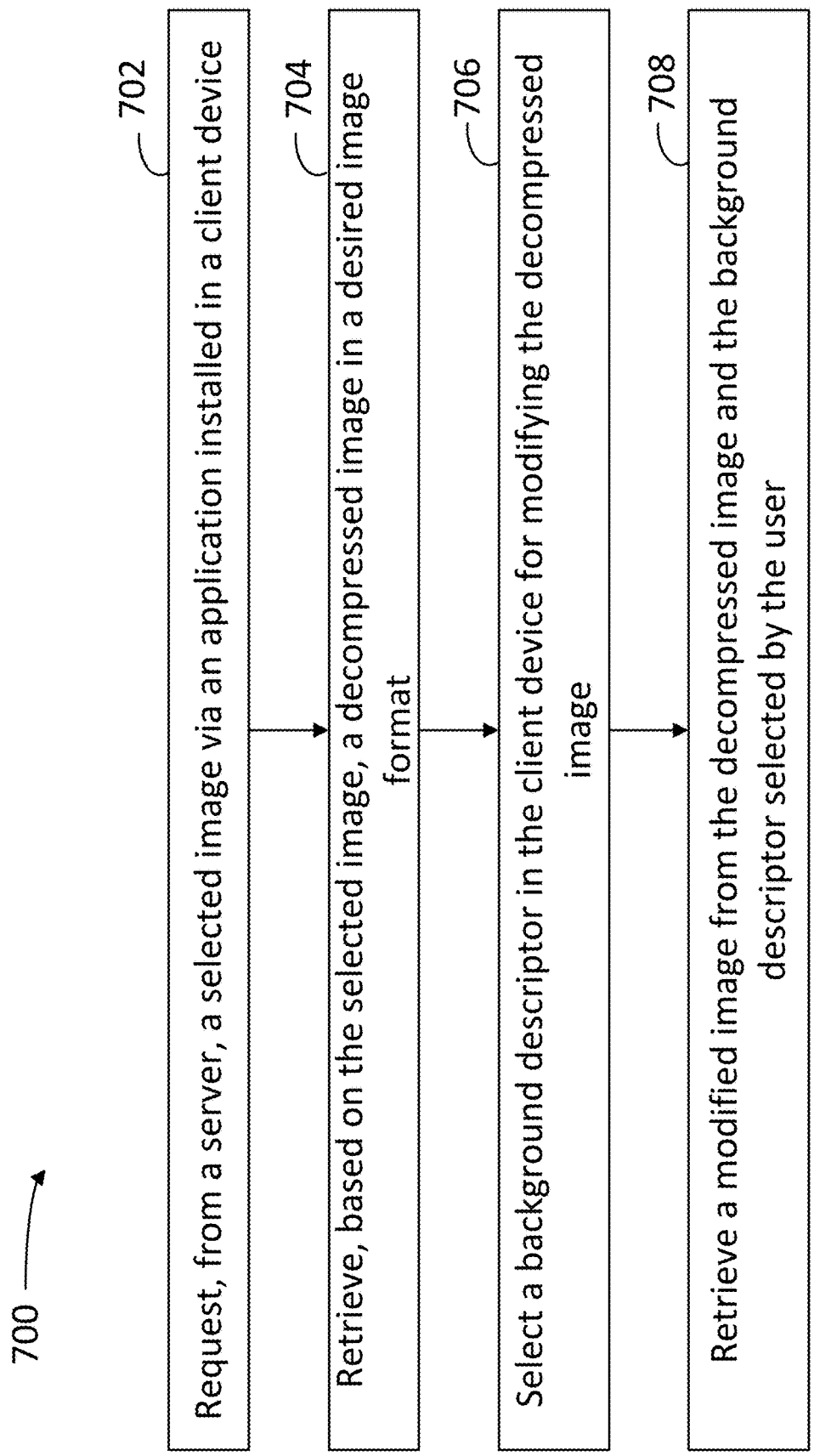
FIG. 7 is a flow chart illustrating steps in a method for image decompression including steps performed by a user with a client device, according to some embodiments.

FIG. 7 is a flow chart illustrating steps in a method for image decompression according to some embodiments. Method 700 may be performed at least partially by any one of network servers hosting a collection of images, videos, and multimedia files (e.g., images 300A-E and 400), while communicating with any one of a plurality of client devices through an application installed in the client device, the application accessing a network (e.g., any one of servers 130, any one of clients 110, application 222, and network 150). The client devices may be handled by a user, wherein the user may be registered to a private account with the server, or may be a visitor to the server website or logged in a server application installed in the client device. At least some of the steps in method 700 may be performed by a computer having a processor executing commands stored in a memory of the computer (e.g., processors 212 and 236, memories 220 and 232). In some embodiments, the commands executed by the processor may include a neural network (e.g., CNN 240). Further, steps as disclosed in method 700 may include retrieving, editing, and/or storing files in a database that is part of, or is communicably coupled to, the computer. The database may include any one of an image database, an interaction history database, a training database, or an annotated training database (e.g., image database 252, interaction history database 254, training database 248, and annotated training database 250). Methods consistent with the present disclosure may include at least some, but not all of the steps illustrated in method 700, performed in a different sequence. Furthermore, methods consistent with the present disclosure may include at least two or more steps as in method 700 performed overlapping in time, or almost simultaneously.

Step 702 includes requesting, from a server, a selected image via an application installed in the client device. In some embodiments, step 702 may include placing a search query in the search engine for the server, and requesting a selected image from a plurality of images returned by the search engine in response to the search query.

Step 704 includes retrieving, based on the selected image, a decompressed image in a desired image format. In some embodiments, step 704 includes displaying the decompressed image on a display in the client device, and displaying a non-salient portion of the decompressed image with a plurality of pixels configured to a same color.

Step 706 includes selecting a background descriptor in the client device for modifying the decompressed image. In some embodiments, step 706 includes identifying a desirable element in a flattened portion of the decompressed image. Accordingly, the user may identify a desirable feature on the edge of a salient image portion and may desire to modify the background of the salient image portion to reveal more of the desirable feature, or change the image context. Moreover, in some embodiments step 706 may include selecting a background descriptor to provide a more detailed view of the background in the flattened image portion. A more detailed view of the background may include a better-resolved view of the background.

Step 708 includes retrieving a modified image from the decompressed image, wherein the modified image is based on a modification of the decompressed image according to the selected background descriptor. In some embodiments, step 708 includes retrieving a second modified image from the decompressed image, wherein the second modified image is based on a modification of the decompressed image according to the second background descriptor.

Hardware Overview

Figure 8:
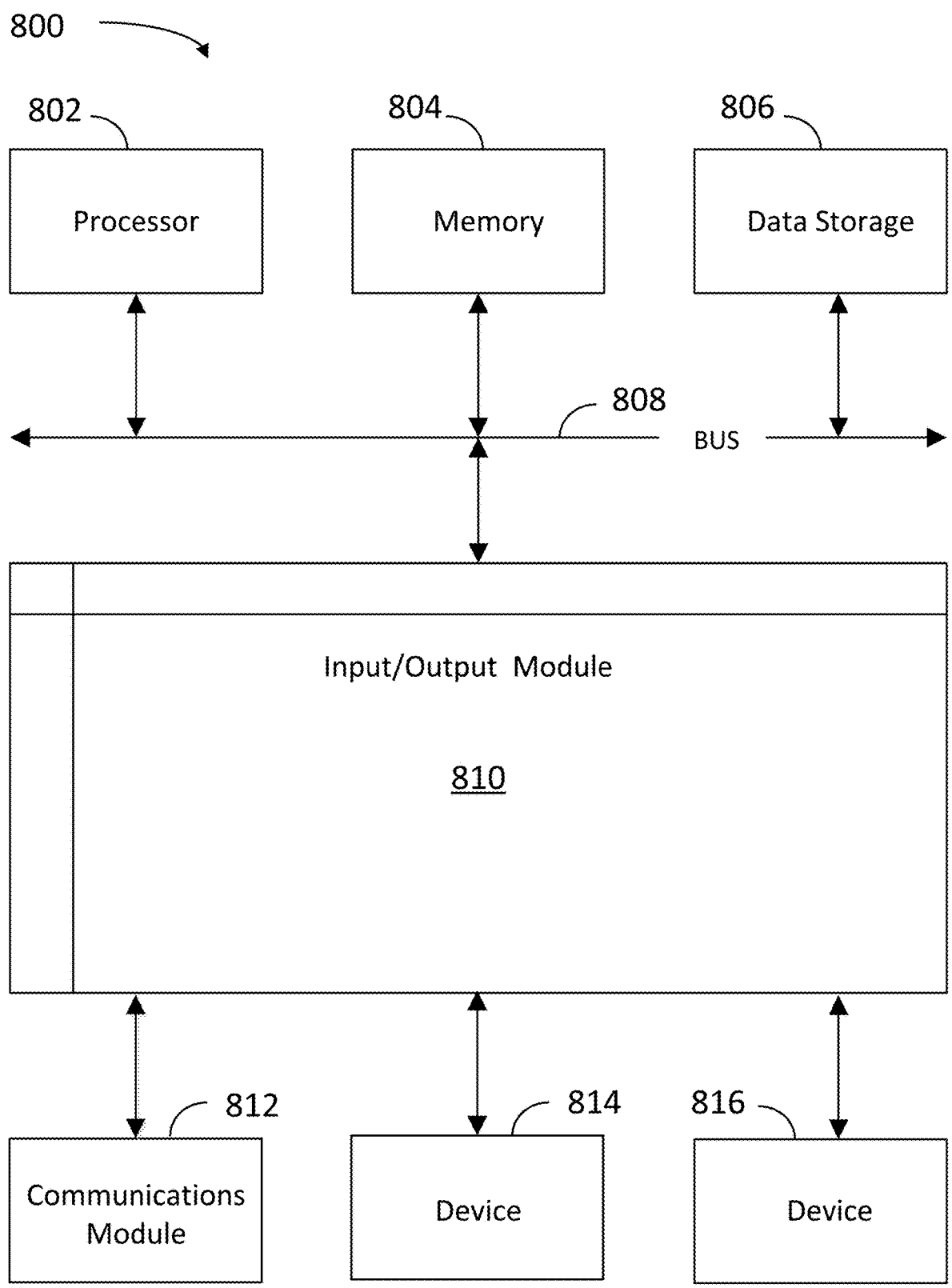
FIG. 8 is a block diagram illustrating an example computer system with which the client and server of FIG. 2 and the methods of FIGS. 4-6 can be implemented.

FIG. 8 is a block diagram illustrating an exemplary computer system 800 with which any one of clients 110 and any one of servers 130 of FIG. 1 can be implemented. In certain aspects, the computer system 800 may be implemented using hardware or a combination of software and hardware, either in a dedicated server, or integrated into another entity, or distributed across multiple entities.

Computer system 800 (e.g., client 110 and server 130) includes a bus 808 or other communication mechanism for communicating information, and a processor 802 (e.g., processors 212 and 236) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, i.e., one or more modules of computer program instructions encoded on a computer readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. The input/output module 810 can be any input/output module. Exemplary input/output modules 810 include data ports such as USB ports. The input/output module 810 is configured to connect to a communications module 812. Exemplary communications modules 812 (e.g., communications modules 218 and 238) include networking interface cards, such as Ethernet cards and modems. In certain aspects, the input/output module 810 is configured to connect to a plurality of devices, such as an input device 814 (e.g., input device 214) and/or an output device 816 (e.g., output device 216). Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 816 include display devices, such as a LCD (liquid crystal display) monitor, for displaying information to the user.

According to one aspect of the present disclosure, the client 110 and server 130 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires that comprise bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   retrieving an image from a user in a pre-selected format;
   detecting a compression efficiency for the image; and
   when the compression efficiency is above a pre-selected threshold:
     obtaining a saliency representation of the image;
     capturing a feature description of a non-salient portion of the image;
     flattening the non-salient portion in a new image;
     storing the new image in a selected format in a memory; and
     storing a background descriptor for the image in the memory.

2. The computer-implemented method of claim 1, wherein detecting the compression efficiency comprises comparing a first image vector for the image with a second image vector of a second image from an interaction history database, and defining the compression efficiency based on a compression efficiency of the second image when a distance between the first image vector and the second image vector is lower than a pre-selected threshold, and wherein the first image vector is produced by a convolutional neural network applied over the image.

3. The computer-implemented method of claim 1, wherein detecting the compression efficiency comprises setting the compression efficiency as a ratio of a size of a compressed image to a size of an uncompressed image.

4. The computer-implemented method of claim 1, wherein obtaining a saliency representation of the image comprises associating a saliency value to at least a portion of the image, wherein the saliency value is determined from a style class strength of the portion of the image.

5. The computer-implemented method of claim 1, wherein capturing a feature description of a non-salient portion of the image comprises determining the non-salient portion of the image based on a saliency value of the non-salient portion being lower than a pre-selected threshold, wherein the saliency value is determined from a style class strength of the non-salient portion of the image.

6. The computer-implemented method of claim 1, wherein capturing a feature description of a non-salient portion of the image comprises storing in the memory a reference to a feature description of an image stored in an image database.

7. The computer-implemented method of claim 1, wherein flattening the non-salient portion in a new image comprises configuring a plurality of pixels in the non-salient portion of the image to have a same color value.

8. The computer-implemented method of claim 1, wherein storing the new image in a selected format comprises storing the new image in a compressed version of the selected format.

9. The computer-implemented method of claim 1, wherein the background descriptor is a text string provided by the user comprising a description of a background of the image, and storing the background descriptor for the image comprises selecting a representative vector from an annotated training database comprising a plurality of vectors associated with the text string provided by the user.

10. The computer-implemented method of claim 1, further comprising decompressing the image in the pre-selected format, and adding a background to the image based on the background descriptor.

11. A system, comprising:
a memory storing multiple instructions; and
one or more processors coupled to the memory and configured to execute at least one instruction to cause the system to:
retrieve an image from a user in a pre-selected format;
detect a compression efficiency for the image; and
when the compression efficiency is above a pre-selected threshold:
obtain a saliency representation of the image;
capture a feature description of a non-salient portion of the image;
flatten the non-salient portion in a new image;
store the new image in a selected format in a memory; and
store a background descriptor for the image in the memory.

12. The system of claim 11, wherein to detect the compression efficiency the one or more processors execute instructions to compare a first image vector for the image with a second image vector of a second image from an interaction history database, and to define the compression efficiency based on a compression efficiency of the second image when a distance between the first image vector and the second image vector is lower than a pre-selected threshold, and wherein the first image vector is produced by a convolutional neural network applied over the image.

13. The system of claim 11, wherein to detect the compression efficiency the one or more processors execute instructions to set the compression efficiency as a ratio of a size of a compressed image to a size of an uncompressed image.

14. The system of claim 11, wherein to obtain a saliency representation of the image the one or more processors execute instructions to associate a saliency value to at least a portion of the image, wherein the saliency value is determined from a style class strength of the portion of the image.

15. The system of claim 11, wherein to capture a feature description of a non-salient portion of the image the one or more processors execute instructions to determine the non-salient portion of the image based on a saliency value of the non-salient portion being lower than a pre-selected threshold, wherein the saliency value is determined from a style class strength of the non-salient portion of the image.

16. The system of claim 11, wherein to capture a feature description of a non-salient portion of the image the one or more processors execute instructions to store in the memory a reference to a stored feature description of an image stored in an image database.

17. The system of claim 11, wherein to flatten the non-salient portion in a new image the one or more processors execute instructions to configure a plurality of pixels in the non-salient portion of the image to have a same color value.

18. The system of claim 11, wherein to store the new image in a selected format the one or more processors execute instructions to store the new image in a compressed version of the selected format.

19. The system of claim 11, wherein the background descriptor is a text string provided by the user comprising a description of a background of the image, and to store the background descriptor for the image the one or more processors execute instructions to select a representative vector from an annotated training database comprising a plurality of vectors associated with the text string provided by the user.

20. The system of claim 11, wherein the one or more processors further execute instructions to decompress the image in the pre-selected format, and to add a background to the image based on the background descriptor.

* * * * *